US010264742B2

(12) United States Patent
Lame et al.

(10) Patent No.: US 10,264,742 B2
(45) Date of Patent: Apr. 23, 2019

(54) SYSTEM, PARTICULARLY FOR VEGETATION CULTIVATION, INCLUDING A WATER RESERVE WITH CONSTANT OVERFLOW

(71) Applicant: Sarl Le Prieure, Moisy (FR)

(72) Inventors: Raphael Lame, Moisy (FR); Jean-Christophe Grimard, Cellettes (FR)

(73) Assignee: Sarl Le Prieure (FR)

(*) Notice: Subject to any disclaimer, the term of this patent is extended or adjusted under 35 U.S.C. 154(b) by 0 days.

(21) Appl. No.: 14/751,719

(22) Filed: Jun. 26, 2015

(65) Prior Publication Data

US 2015/0373932 A1  Dec. 31, 2015

(30) Foreign Application Priority Data

Jun. 26, 2014 (FR) ...................... 14 55986

(51) Int. Cl.
*B01D 29/56* (2006.01)
*A01G 27/00* (2006.01)
(Continued)

(52) U.S. Cl.
CPC ........... *A01G 27/008* (2013.01); *A01G 9/033* (2018.02); *A01G 27/003* (2013.01); *B01D 29/56* (2013.01); *B01D 35/02* (2013.01); *G05D 7/0146* (2013.01)

(58) Field of Classification Search
CPC .................................................. A01G 27/008
See application file for complete search history.

(56) References Cited

U.S. PATENT DOCUMENTS 3,836,000 A * 9/1974 Jakubek ............. B01D 17/0202
210/104
5,275,721 A * 1/1994 Mathews ............... B01D 35/02
210/167.19
(Continued)

FOREIGN PATENT DOCUMENTS

EP  1044599 A1  10/2000
FR  2703213 A1  10/1994

OTHER PUBLICATIONS

French Search Report for Application No. 1455986 dated Feb. 24, 2015.

*Primary Examiner* — Peter Keyworth
(74) *Attorney, Agent, or Firm* — Lerner, David, Littenberg, Krumholz & Mentlik, LLP

(57) ABSTRACT

The invention relates to a system, particularly for vegetation cultivation, including a water reserve, a device for controlling the flow towards the exterior of the volume contained in the reserve, including a floating regulator placed in the reserve to monitor the level thereof, which floating regulator defines a chamber having at least one upper inlet orifice in fluidic communication with the reserve volume, at least one lower calibrated outlet orifice of reduced section in communication with the exterior, such that the floating regulator allows a discharge of water towards the exterior via the outlet orifice at constant flow rate as long as the water level in the reserve is above the height of the inlet orifice and interrupts the discharge of water towards the exterior via the outlet orifice when the water level is below the inlet orifice to then define a water reserve. The invention also relates to the floating regulator, the use thereof and/or of the system, and a water reserve control method.

33 Claims, 9 Drawing Sheets

(51) Int. Cl.
   *B01D 35/02* (2006.01)
   *G05D 7/01* (2006.01)
   *A01G 9/033* (2018.01)

(56) References Cited

U.S. PATENT DOCUMENTS

| | | | | |
|---|---|---|---|---|
| 5,290,434 | A * | 3/1994 | Richard | B01D 21/2444 |
| | | | | 137/398 |
| 6,997,644 | B2 * | 2/2006 | Fleeger | E03F 5/101 |
| | | | | 405/96 |
| 8,580,560 | B1 * | 11/2013 | Ellis | B01D 15/165 |
| | | | | 210/232 |
| 2004/0035466 | A1 * | 2/2004 | Oretti | A01G 27/003 |
| | | | | 137/445 |
| 2010/0325975 | A1 | 12/2010 | Mischo | |
| 2012/0243940 | A1 * | 9/2012 | Thenhaus | A01G 25/165 |
| | | | | 405/37 |

* cited by examiner

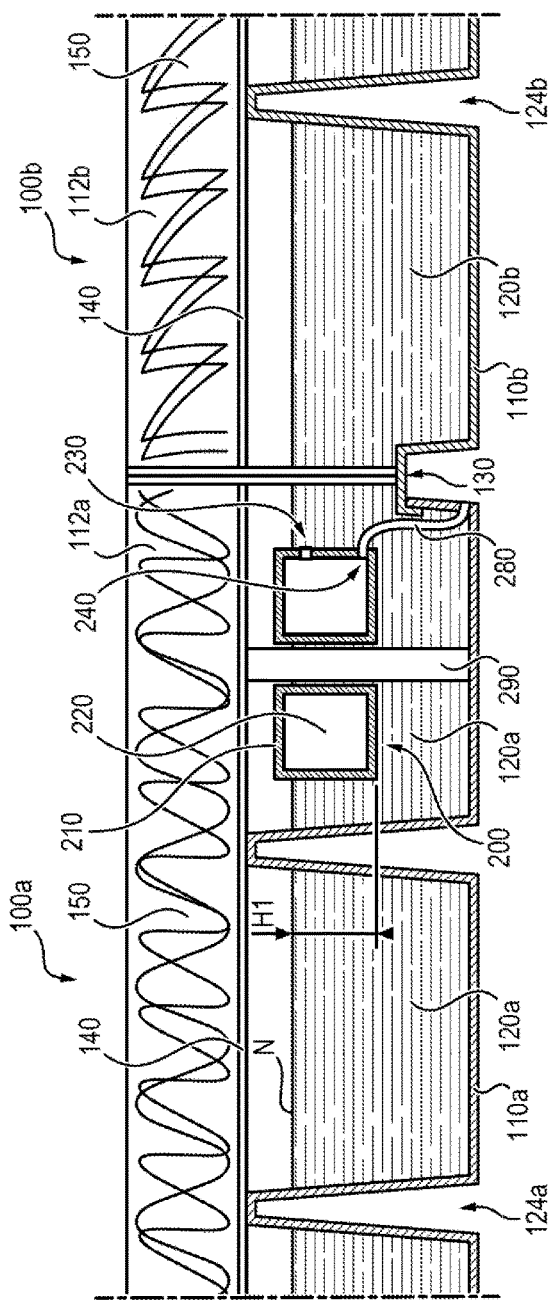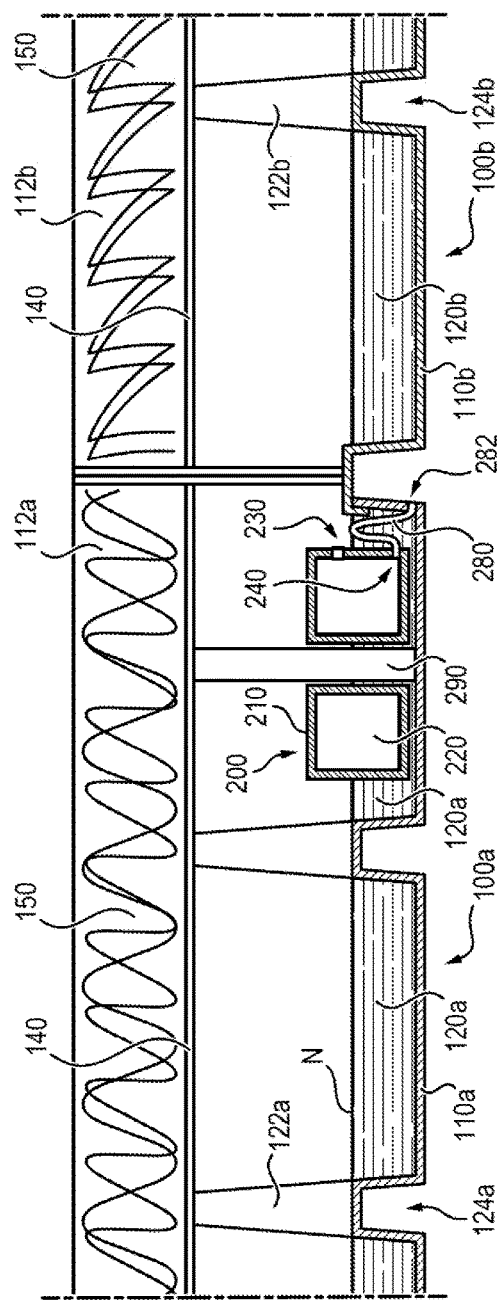

SYSTEM, PARTICULARLY FOR VEGETATION CULTIVATION, INCLUDING A WATER RESERVE WITH CONSTANT OVERFLOW

CROSS REFERENCE TO RELATED APPLICATIONS

The present application claims the benefit of the filing date of French Patent Application No. 1455986, filed Jun. 26, 2014, the disclosure of which is hereby incorporated herein by reference.

FIELD OF THE INVENTION

The present invention relates to the field of systems including a water reserve, particularly for vegetation cultivation.

BACKGROUND OF THE INVENTION

More specifically, the present invention relates to means of managing the volume of a water reserve capable of being supplied for example, but not exclusively, by natural rainfall.

Even more specifically, the present invention applies quite particularly, but not exclusively, to the management of the volume of the water reserve contained in plant growing trays, for example for roofs of buildings or equivalent, such as for example the trays described in the document EP 1 044 599.

In EP 1 044 599 are described trays formed preferably of plastic material and including:
- a bottom of general rectangular shape,
- a lateral edge which surrounds the bottom,
- a plurality of recesses or compartments formed in the bottom,
- means which enable a fluidic communication between the different recesses or compartments, for example formed of troughs on the top of the partitions delimiting the recesses and,
- overflow orifices on the top of said partitions.

Trays of the aforementioned type have already known great success. However, they are sometimes subject to suddenly receiving a very considerable volume of water, in the event for example of a storm. It is advisable as far as possible to discharge this important input at least in part quite quickly for the comfort of the cultivated plants and to make the storage volume again available for following storms, while making it possible to maintain a contrario a consequent reserve useful in the event of a long drought period.

In this context the aim of the present invention is to perfect the prior art.

BRIEF SUMMARY OF THE INVENTION

The aim of the present invention is in particular to enable a discharge at constant flow rate of important inputs and sudden inflows of water, for example in the event of a violent storm. Discharge at constant flow rate is important so as not to overload canalization means such as collective sanitation means or "mains drainage". The invention thus makes it possible to reduce the risks of run off of water on streets and the risks of flooding.

The aforementioned aims are attained within the scope of the present invention thanks to a system, particularly for vegetation cultivation, including a water reserve, characterised by the fact that it includes in addition a device for controlling the flow towards the exterior of the volume contained in the reserve, which control device includes a floating regulator placed in the reserve for monitoring the water level therein, the floating regulator defining a chamber having at least one upper inlet orifice in fluidic communication with the reserve volume and at least one lower calibrated outlet orifice, of reduced section so as to slow down and restrain the flow, in communication with the exterior, such that the floating regulator allows a discharge of water to the exterior via the outlet orifice, at constant flow rate, as long as the water level in the reserve is above the height of the inlet orifice, and interrupts the discharge of water towards the exterior via the outlet orifice when the water level in the reserve is below the level of the inlet orifice to then define a water reserve.

As will be explained in greater detail hereafter, the structure of the system defined within the scope of the invention makes it possible to obtain a constant outflow rate as long as the water level in the reserve is above the height of the inlet orifice provided on the floating regulator due to the fact that the floating regulator makes it possible to define a constant water column height between the inlet in the chamber and its outlet as long as the water level in the reserve is above the height of the level of the inlet orifice.

The invention is advantageously completed by the following characteristics, taken alone or according to any technically possible combinations thereof:
- the system includes a flexible connecting tube which connects the outlet orifice provided on the floating regulator to the exterior of the container, the calibrated outlet orifice defining the main orifice of head loss towards the exterior;
- the system includes means of guiding with vertical movement the floating regulator;
- the guiding means include a vertical pillar engaged in a through channel formed at the centre of the floating regulator;
- the system includes filtering means inserted between each inlet orifice and each outlet orifice;
- the system includes at least one filtering stage, preferably two filtering stages and very preferentially three filtering stages chosen from the group including: a coarse filter, a settling chamber and a fine filter;
- the system includes several inlet orifices;
- the system includes several outlet orifices;
- the different outlet orifices have different calibrated diameters;
- the outlet orifices are defined on inserts added onto a casing;
- the system includes means of adjusting the height of the inlet orifice;
- the means of adjusting the height of the inlet orifice are chosen from the group including: wedges or washers of variable thickness placed around a guiding pillar under the floating regulator, a height adjustable foot connected to the floating regulator, a nut screwed onto a guiding pillar and forming a stop to the floating regulator, a guiding pillar including a pillar bearing a height adjustable stop, a plurality of inlet orifices provided at different heights on a casing and capable of being sealed off selectively, a casing made of two parts capable of relative movement, for example by screwing and respectively comprising an inlet orifice and an outlet orifice or a tray of which the bottom has a staged relief which conditions the reserve volume as a function of the place where the float sets down;

the floating regulator casing includes at least one vent;
the floating regulator is made of thermoplastic material for example made of polyethylene and/or polypropylene;
the floating regulator is placed in a cassette arranged outside of the container of the water reserve to facilitate maintenance;
the floating regulator includes a casing 202 formed of two dismantleable elements to facilitate maintenance;
the container of the water reserve constitutes a tray, particularly for the revegetation of roofs of buildings or terraces;
the system further includes means forming air intake adapted to introduce air between the lower calibrated outlet orifice of reduced section and the exterior of the container.

The present invention also relates to a floating regulator for the implementation of the aforementioned system, including a chamber which has at least one upper inlet orifice intended to be placed in fluidic communication with a reserve volume and at least one lower calibrated outlet orifice in communication with the exterior such that the floating regulator allows a discharge of water towards the exterior via the outlet orifice at constant flow rate as long as a water level is above the height of the inlet orifice.

The invention in addition relates to the use of the aforementioned floating regulator and/or the aforementioned system for the discharge at constant flow rate of a surplus of water reserve.

The invention moreover relates to a method of controlling a water reserve, characterised by the fact that it includes the steps consisting in arranging, in a water reserve, a floating regulator equipped with a chamber having at least one upper inlet orifice in communication with at least one lower calibrated outlet orifice of reduced section, connecting the lower calibrated orifice with a space outside of the water reserve, allowing a discharge of water towards the exterior via the outlet orifice at constant flow rate whatever the water level in the container as long as the water level is above the height of the inlet orifice and interrupts the discharge of water towards the exterior via the outlet orifice when the water level in the reserve is below that of the inlet orifice.

BRIEF DESCRIPTION OF THE DRAWINGS

Other characteristics, aims and advantages of the present invention will become clear on reading the detailed description that follows, and with regard to the appended drawings, given as non-limiting examples and in which:

FIG. 1 represents a schematic view in vertical section of two trays placed side by side and connected hydraulically, of which one equipped with a flow control device with floating regulator according to the present invention, in the upper part of a water reserve, and consequently in a regulation phase at constant flow rate of the reserve overflow, FIG. 2 represents a similar view in vertical section, but along a plane of section different to that of FIG. 1, of the same trays with a low level of water in the reserve, the flow device with floating regulator according to the invention then resting on the bottom of the tray, and consequently in a stop phase of the regulated flow.

DETAILED DESCRIPTION

Figure 3:
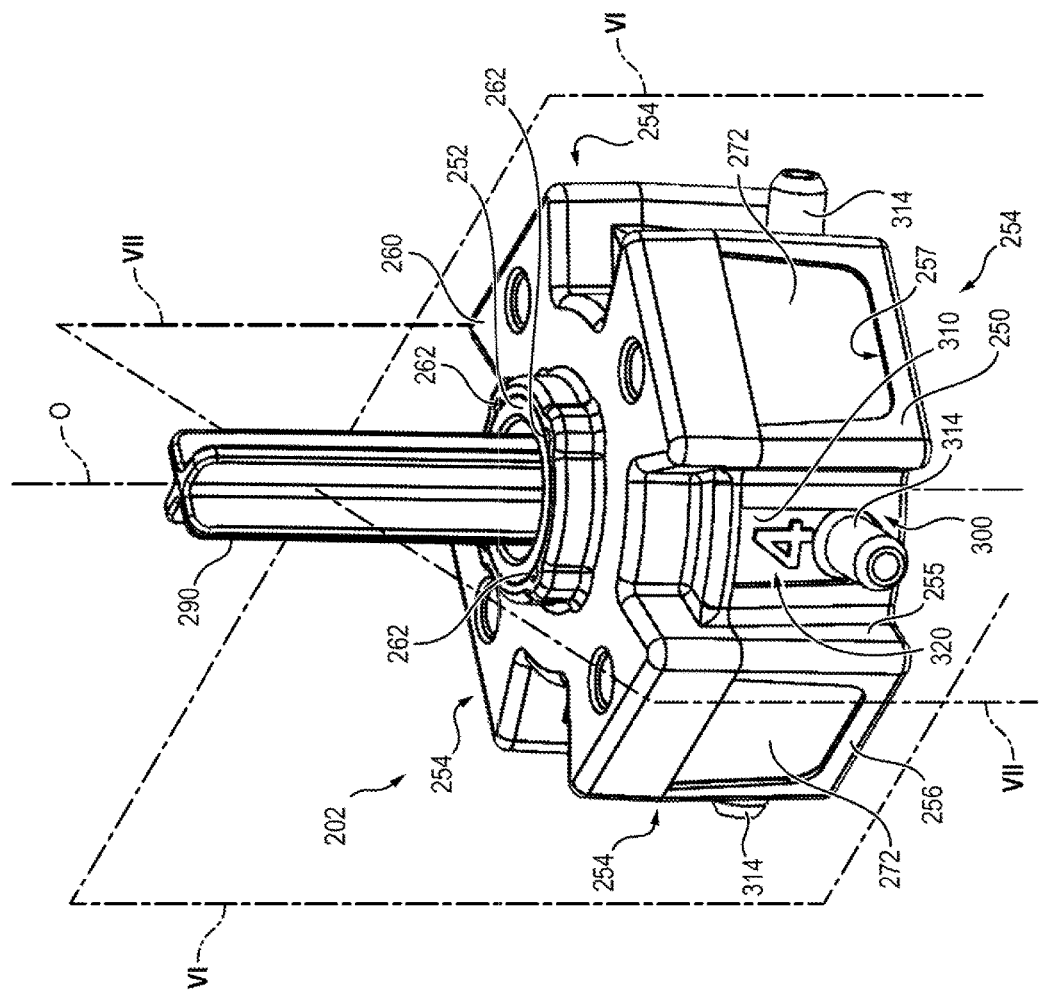
FIG. 3 represents an external schematic view in perspective of a flow control device with floating regulator according to the present invention, in assembled position, engaged on a central guiding pillar.
Figure 4:
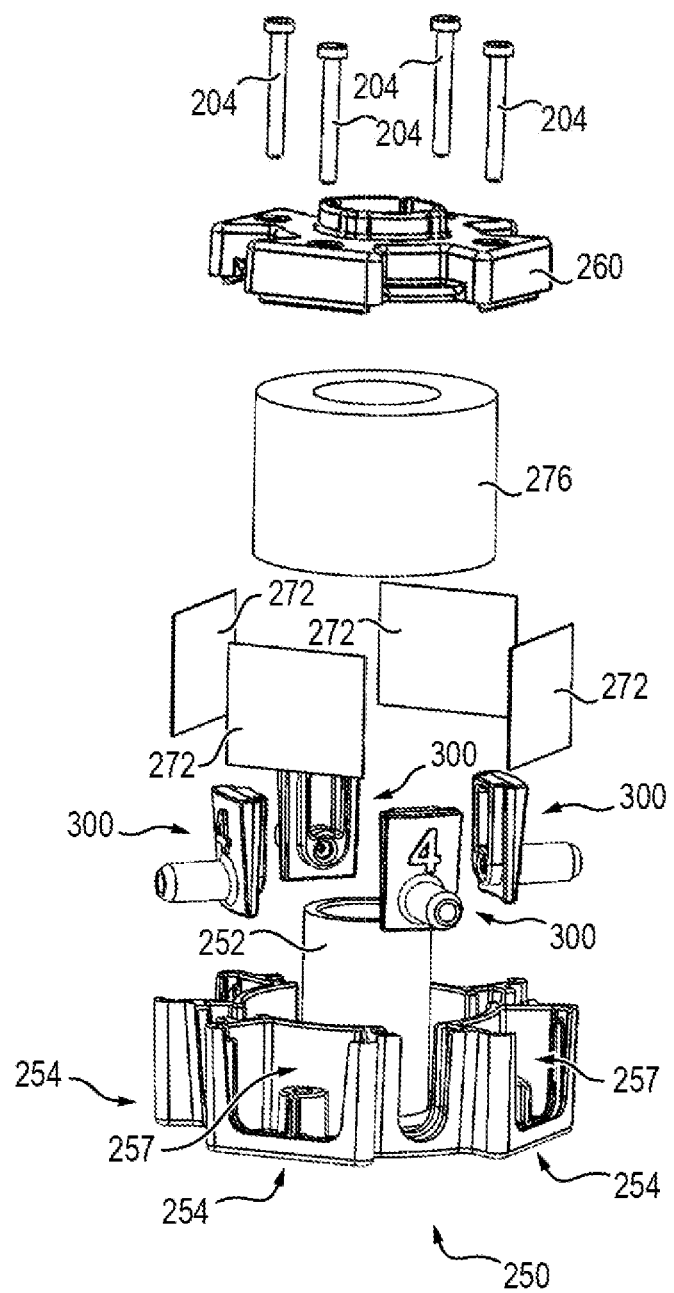
FIG. 4 represents an exploded perspective view of the component parts of the flow control device with float.

In FIGS. 1 and 2 may in particular be seen two trays 100a, 100b each including a bottom 110a, 110b, a lateral edge 112a, 112b which surrounds the bottom, a plurality of recesses 120a, 120b formed on the bottom 110a, 110b and means 122a, 122b which enable a fluidic communication between the different recesses 120a, 120b. The aforementioned communication means 122a, 122b may be formed for example of troughs formed on the top of the partitions 124a, 124b delimiting the recesses 120a, 120b, as may be seen by a comparative examination of FIGS. 1 and 2 passing through planes of different vertical section.

As will be described hereafter, the partitions 124 can serve as support for a porous sheet 140 on which is arranged a cultivation substrate.

Figure 8:
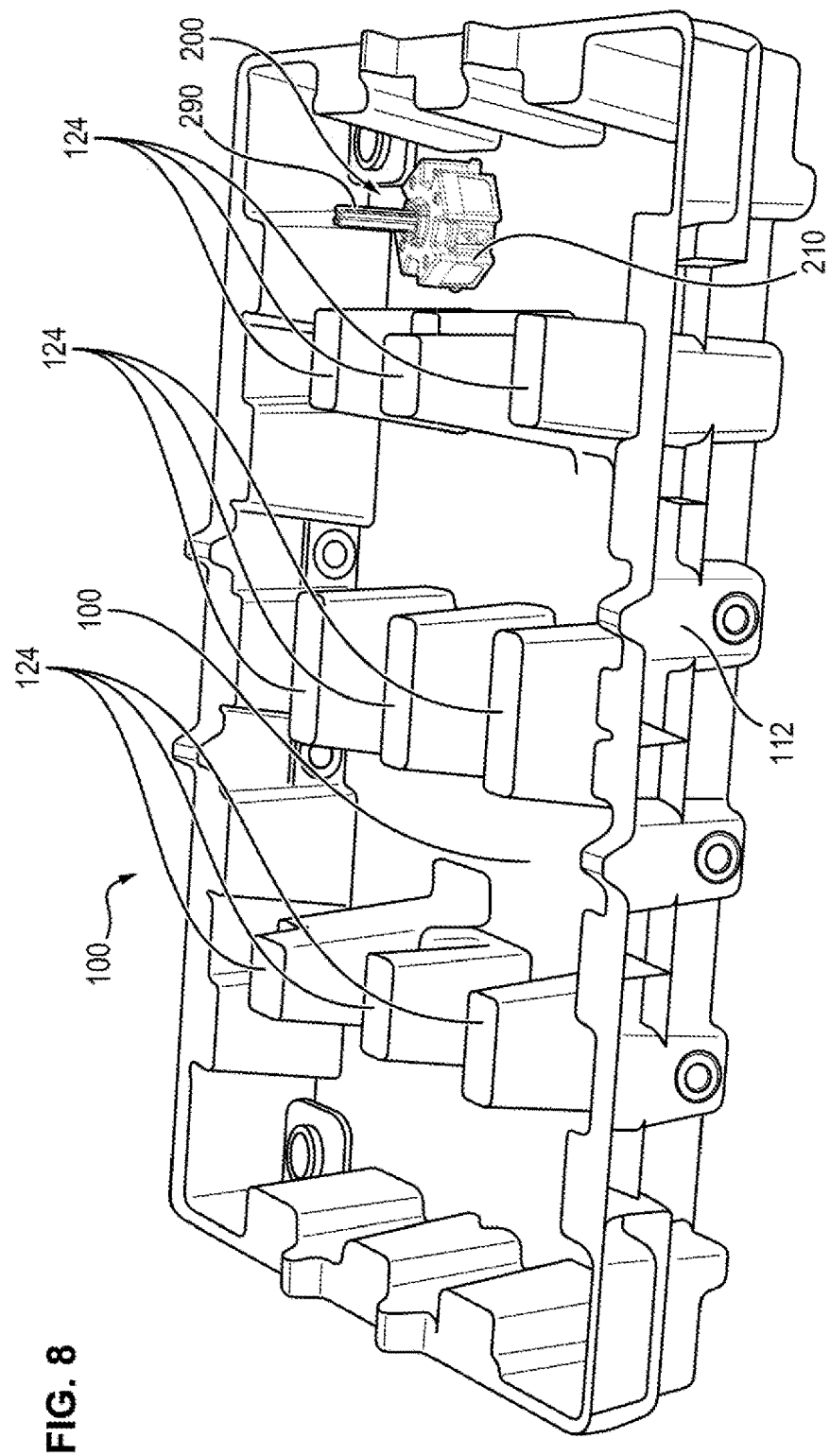
FIG. 8 represents a schematic perspective view of a plant growing tray equipped with a flow control device with float according to the present invention.

In FIG. 8 is represented an embodiment variant according to which the partitions 124 are formed simply of local blocks such that the recesses and compartments 120a, 120b are in wide mutual communication around the aforementioned blocks 124.

According to the particular representation given in FIGS. 1 and 2, the two adjacent trays 100a, 100b are connected by one of their faces adjacent to the edge 112a, 112b and in fluidic communication at this level via means that are conventional in themselves and represented schematically under the reference 130.

Such means 130 are essentially formed of mutual encasing means with leak-tight fluidic connection. They may be the subject of numerous embodiments and will not be described in greater detail hereafter.

The trays illustrated in FIGS. 1 and 2 are preferably used for vegetation cultivation. To this end, a porous sheet 140 is preferably arranged on the top of the partitions 124a, 124b or equivalent blocks, to receive a mass of substrate or compost 150 suitable for accommodating in the upper part of the tray the plants to be grown. The sheet 140 thus serves as interface between the substrate 150 situated in the upper part of the trays and a water reserve formed in the recesses 120a, 120b.

The presence will also be noted according to FIGS. 1, 2 and 8 of a flow control device or floating regulator 200 according to the present invention, including a float 210.

According to a particular and non-limiting embodiment illustrated in FIGS. 1 and 2, the float 210 has an annular shape, centred on an axis vertical to use. It is engaged in its centre on a vertical guiding pillar 290, integral with the bottom 110a of the tray 100a. The float 210 is thus guided with vertical movement along the height of the pillar 290 as a function of the evolutions of the water level in the reserve of the trays 100a, 100b.

In FIGS. 1 and 2, the water level is referenced N.

The float 210 defines an inner chamber 220.

The chamber 220 has at least one inlet orifice 230 situated in the upper part of the float 210. The inlet orifice 230 is in fluidic communication, without head loss, with the volume of water contained in the reserve of the tray 100a. The chamber 220 also has at least one lower calibrated outlet orifice 240.

The outlet orifice 240 is connected to the exterior of the container of the water reserve, via a conduit 280. The conduit 280 is flexible and of a sufficient length so as not to disrupt and, quite the contrary, to allow the movement of the float 210 along the mast 290 as a function of the fluctuations of water level. The conduit 280 is formed typically of a tube made of plastic material. It is however sufficiently rigid so as not to be compressed under the effect of the pressure of water contained in the reserve and thus to assure a free flow. It will be noted that the calibrated orifice of narrower section defining the head loss at the outlet of the chamber 220 is defined at the level of the outlet orifice 240 provided on the float 210.

Thus within the scope of the present patent application "calibrated orifice of reduced section" is taken to mean an orifice which defines the greatest head loss between the inlet orifices 230 and the orifice 282 through which the conduit 280 emerges onto the exterior of the container.

Thus, as may be seen in FIG. 1, as long as the level N of water in the reserve is above the height of the inlet orifice 230, that is to say that the floating regulator floats and does not rest on the bottom of a tray, the flow rate of water discharging from the floating regulator via the outlet orifice 240 is defined by the height H1 of the water column present above the outlet orifice 240.

As long as the float 210 floats, this height H1 of water column present above the outlet orifice 240 is constant and consequently the discharge flow rate is then constant.

Conversely, when the float 210 rests on the bottom 110a of the tray 100a and when the water level drops below the level of the inlet orifice 230, the discharge of water by means of the float 210 is interrupted to then constitute a water reserve available for example for the irrigation of vegetation.

The particular embodiment of the floating regulator device 200 represented in FIG. 3 and following figures will now be described.

According to this particular embodiment, the float casing 202 is composed of two shells 250, 260, respectively lower and upper.

The two shells 250, 260 have substantially identical star shaped horizontal straight sections. As will be seen on reading the description that follows, according to the non-limiting particular embodiment, the straight section of the two shells 250, 260 includes four branches uniformly spread out around a vertical central axis of symmetry, vertical to use and referenced O-O.

The upper shell 260, which forms a closing cap for the float, is assembled on the lower shell 250 by any appropriate means, for example by threaded means such as four screws 204 according to the particular embodiment represented in the figures.

The two shells 250, 260 define in combination an inner chamber 220. According to the embodiment represented in the figures, the chamber 220 extends essentially into the lower shell 250, this having a height greater than the covering cap 260.

The inner chamber 220 has at least one upper inlet orifice 230 and at least one lower outlet orifice 240.

The lower shell 250 defines a vertical central through channel 251. This channel 251 is fluidically isolated from the chamber 220. The channel 251 is formed by a cylindrical cask 252 of revolution around the axis O-O, connected to a wall with horizontal annular base 253 of the shell 250.

As may be seen in the figures the cask 252 passes through a central passage of the upper shell 260 and extends up to the upper surface thereof.

The float casing 202 is engaged on a vertical and rectilinear guiding mast or pillar 290, through this central through channel 251.

The guiding mast or pillar 290 is fixed to the bottom 110a of the container defining the water reserve. The pillar or mast 290 may be the subject of numerous embodiments. According to a particular embodiment represented in the figures, the mast 290 has a constant horizontal cruciform straight section with four branches. The horizontal straight section of the pillar or mast 290 is complementary to the straight section of the through channel 251 formed in the casing 252, while being at least slightly below the straight section of the channel 251 to enable a free movement of the float 210 vertically on the pillar 290.

The vertical guiding of the float 210 thus defined makes it possible to maintain the float 210 in general horizontal position as illustrated in FIG. 3. This arrangement makes it possible to limit the effects of the stresses applied on the float 210 by the connecting conduit 280. It also makes it possible to maintain the float 210 in general horizontal position as illustrated and thus avoid the filling of the inner chamber 220 with water flowing through vents 262 in the event of accidental oblique inclination of the float 210.

Between the upper covering shell 260 of general star-shaped annular form and the top of the cask 252 are in fact defined a plurality of vents 262, in the form of vertical through passages formed between the shell 260 and the cask 252, to connect the volume of the inner chamber 220 with the exterior. These vents 262 enable a free escape of the air capable of being contained originally in the chamber 220. In a particular embodiment, as illustrated particularly in FIGS. 3, 6 and 7, the vents 262 may be formed of rectilinear grooves, parallel to the axis O-O, realised in the internal cylindrical surface of the through passage formed in the cover 260 to accommodate the upper end of the cask 252.

The invention is not limited to the particular embodiment of vertical guiding means formed by the pillar 290 represented in FIG. 3.

The invention applies in fact to any other equivalent guiding means. The float 210 may for example be guided by several parallel masts or pillars 290 or a mast or pillar cooperating with any other place or means provided on the float 210 may instead be provided, for example a vertical external slide provided on the outer surface of the float casing 202, cooperating with a complementary vertical guide integral with the tray 100a.

According to another characteristic of the invention filtering means 270 are provided in the chamber 220, between each inlet orifice 230 and each outlet orifice 240.

The filtering means 270 may be the subject of numerous embodiments.

The filtering means 270 according to the present invention are preferably multi-stage.

More specifically according to the invention at least one filtering stage, preferably two filtering stages and very advantageously 3 filtering stages are provided, chosen from the group including: a coarse inlet filter, a labyrinth forming settling chamber and a fine filter formed for example of a porous foam.

According to the embodiment represented in figure and following figures, the floating regulator 200 according to the invention includes the aforementioned 3 stages in cascades including a coarse inlet filter 272, a labyrinth forming settling chamber 274 and a fine filter 276.

Even more specifically according to the invention several upper inlet orifices 230 and several lower outlet orifices 240 are preferably provided, advantageously uniformly spread out around the vertical axis O-O.

The number X of inlet orifices 230 may be equal or different to the number Y of outlet orifices 240.

According to a particular embodiment represented in the figures X=Y. The same number of inlet orifices 230 as outlet orifices 240 are thus provided, i.e. in the present case four inlet orifices 230 and four outlet orifices 240, uniformly spread out around the vertical axis O-O.

According to a particular non-limiting embodiment represented in appended FIG. 3 and following figures, the chamber 220 is an annular chamber, centred on the axis O-O, defined between the central cask 252 and an external radially cylindrical partition 259, the base of the cask 252 and the base of the partition 259 being connected in a sealed manner onto the horizontal wall with base 253 of general ring shape.

The lower shell 250 moreover defines four radial excrescences 254 spread out around the axis O-O, on the outer surface of the partition 259. The excrescences 254 are each delimited by two radial vertical flanks 255 and a vertical exterior radially peripheral wall 256. The vertical exterior radially peripheral wall 256 is perforated in the form of a window 257 of general U-shaped rectangular contour. The window 257 emerges onto the upper surface of the shell 250. At the level of the periphery of the window 257 an internal groove 258 is provided intended to receive the edge of a grating, for example metal, forming the coarse inlet filter 272.

In a variant the grating 272 may be made of plastic material.

The shell 250 radially possesses, on the inside of the wall 256, the aforementioned vertical partition 259 connected in a continuous and sealed manner with the wall with horizontal base 253 and the radial flanks 255 to define between the partition 259 and the radially external wall 256, a settling chamber 274.

The height of the partition 259 is less than the height of the shell 250 and below the water level at the floating state of the device, at the level of the excrescences 254. Yet in a variant the covering shell 260 has a hollowing out on its lower surface opposite the top of the partition 259, at the level of each excrescence 254. In this way is formed between the top of the partition 259 and the lower face of the covering shell 260, at the level of each excrescence 254, a passage visible for example in FIG. 6 which constitutes an inlet orifice 230.

Those skilled in the art will understand that 4 inlet orifices 230 are thus provided, at a rate of one inlet orifice 230 at the level of each excrescence 254.

Figure 6:
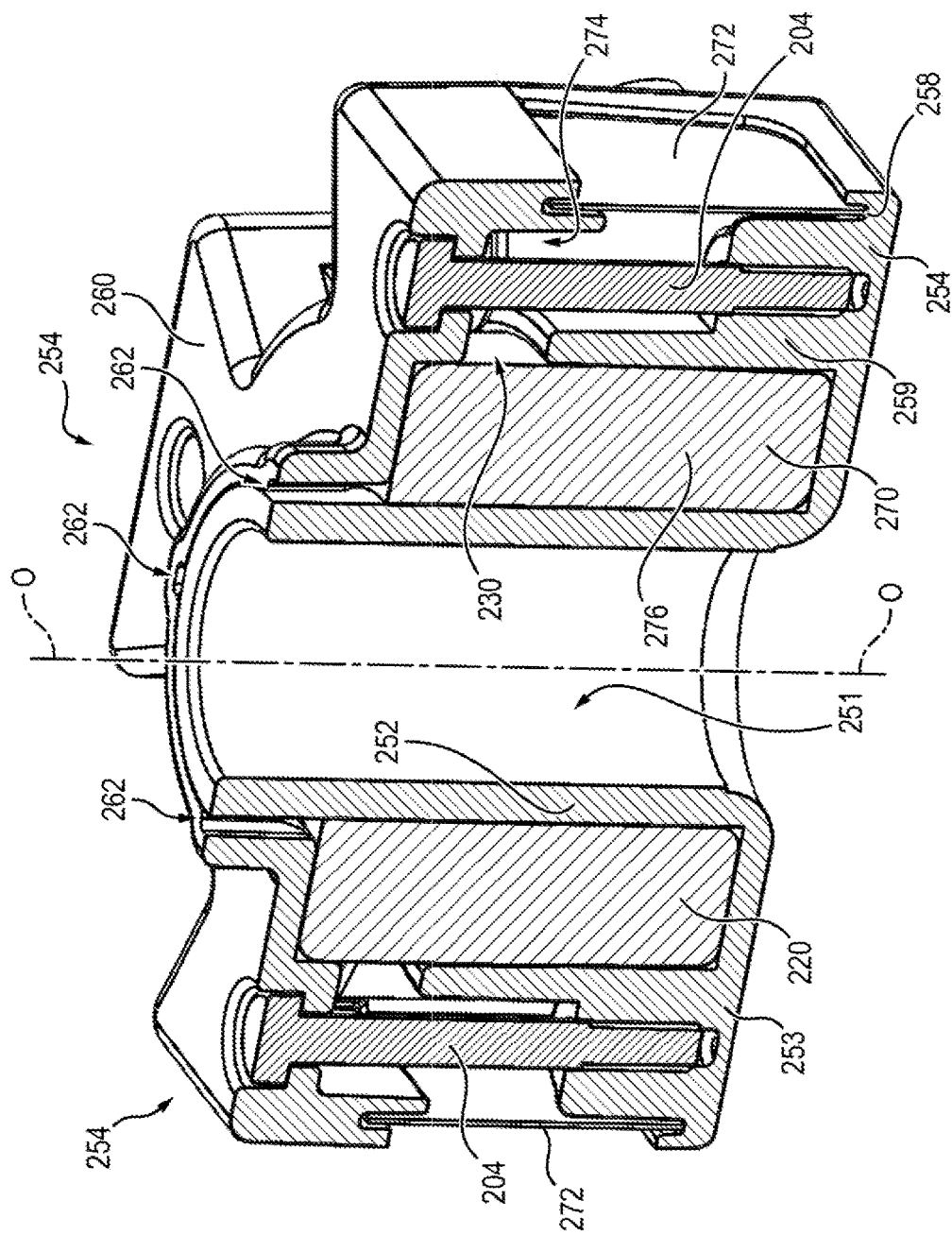
FIG. 6 represents a perspective view with vertical section of the floating regulator casing along a first plane of diametric section referenced VI-VI in FIG. 3.
Figure 7:
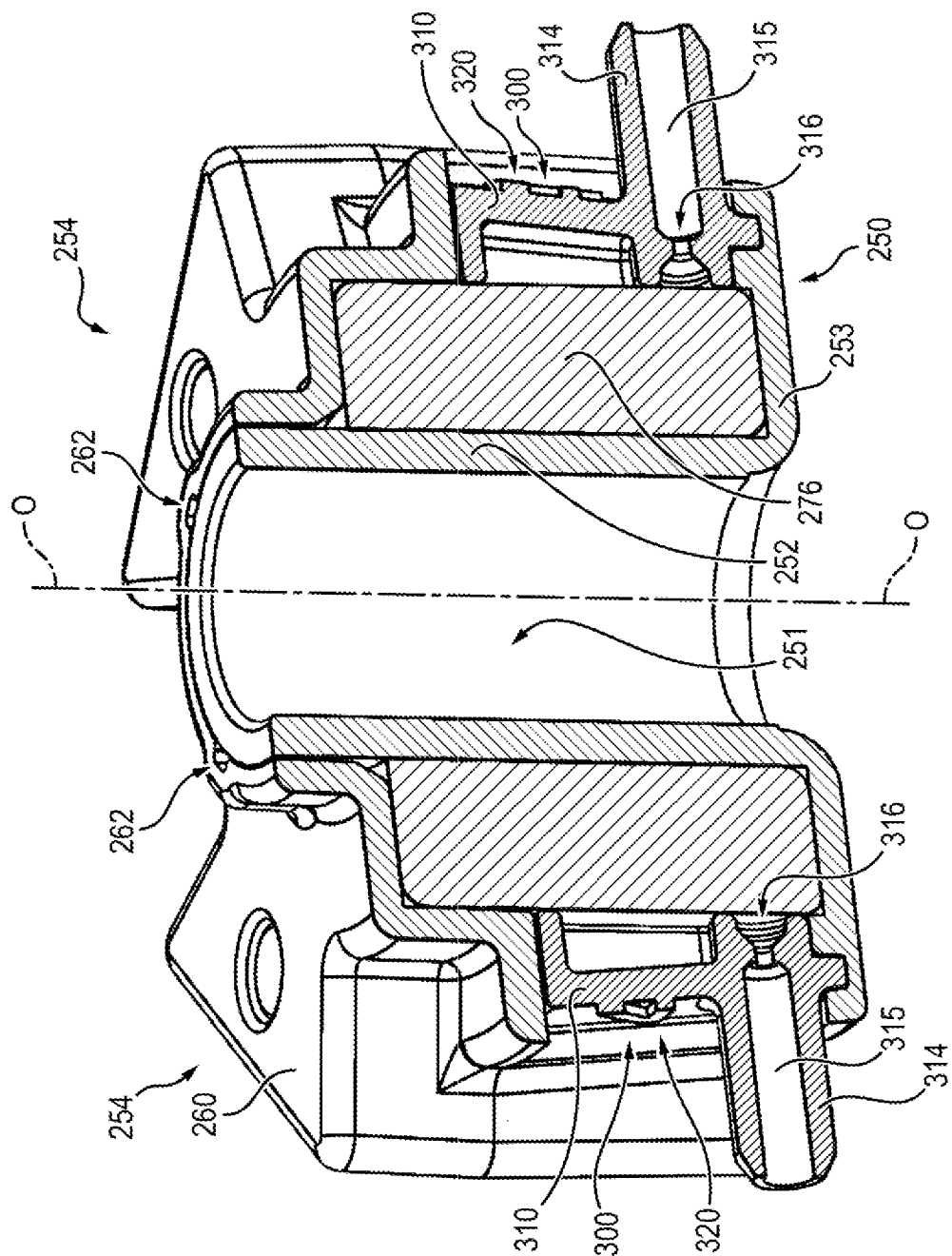
FIG. 7 represents a similar perspective view with vertical section of the same floating regulator casing along a second plane of diametric section referenced VII-VII in FIG. 3.

As may be seen in FIGS. 6 and 7 according to the invention a fine annular filter is moreover preferably provided, formed for example of an annular block of foam of controlled porosity, situated in the chamber 220, that is to say between the central cask 252 and the partition 259.

The float casing illustrated in FIG. 3 and following figures includes, between each pair of excrescences 254, means defining an outlet orifice 240. Thus according to the particular non-limiting embodiment represented in the appended figures four outlet orifices 240 are provided uniformly spread out around the axis O-O, respectively between each pair of adjacent excrescences 254.

The aforementioned outlet orifices 240 may be formed in a calibrated manner directly in the wall of the float casing 200.

However according to the preferential particular embodiment represented in the appended figures the outlet orifices 240 are defined on inserts 300 added onto the lower shell 250.

According to the particular embodiment represented in the figures, each insert 300 is formed of a block 310 of general vertical orientation including ribs 312 projecting on its flanks, adapted to be engaged in a respective complementary groove 242 formed in the shell 250 on the circumference of a window 244 formed in the partition 259 between each pair of excrescences 254.

Each insert 300 further has a nozzle 314 horizontal to use and globally orthogonal to the mid plane of the block 300. Each nozzle 314 has a central through passage 315 which makes it possible to connect the inner volume of the float chamber 220 to the exterior of the container of the reserve. Each nozzle 314 has a calibrated orifice 316.

Figure 5:
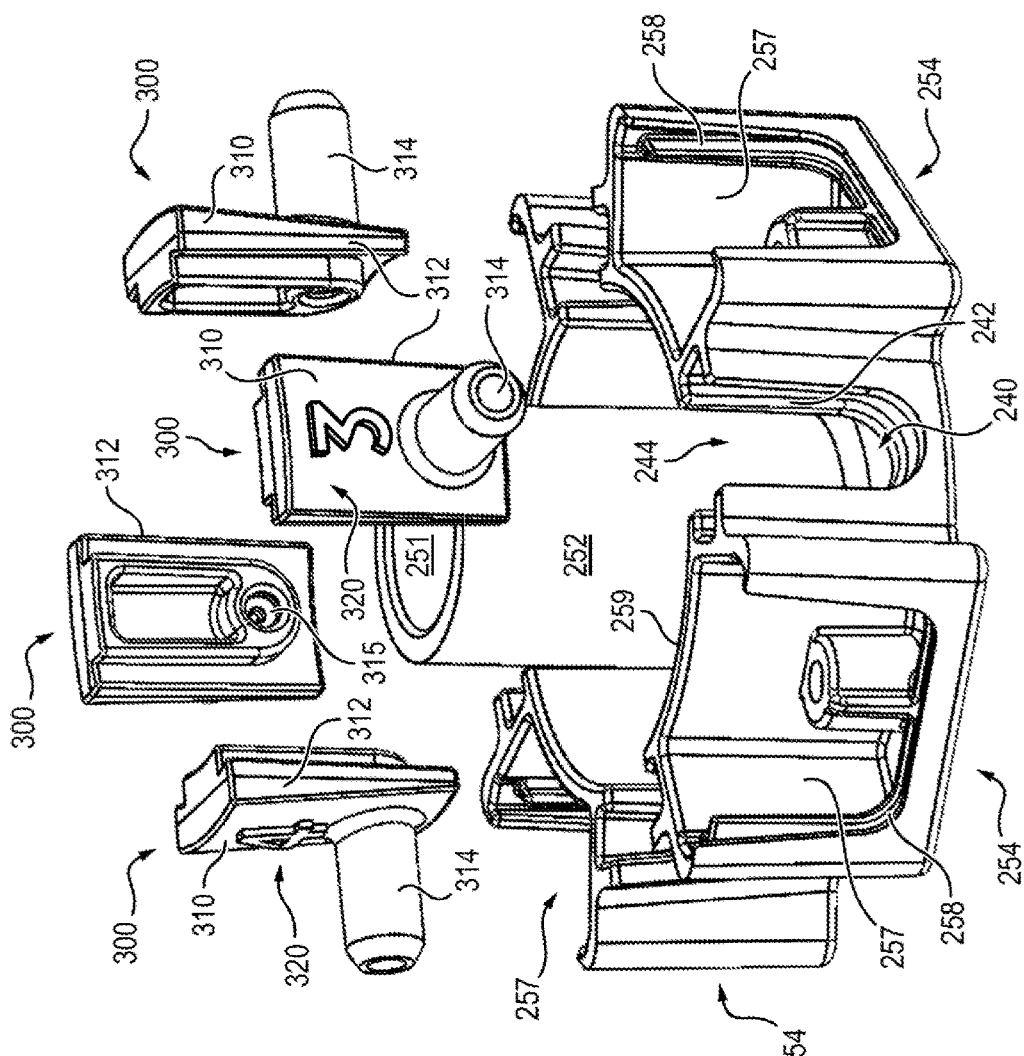
FIG. 5 represents a partial view similar to FIG. 4 and at a large scale of a lower shell of floating regulator casing and of four inserts forming outlet orifices.

As may be seen particularly in FIG. 5 according to the particular non-limiting embodiment represented in the figures, in a particular embodiment four inserts 300 are thus provided defining calibrated outlet passages 316 of respectively different sections.

Obviously a number of inserts different to four may be provided.

Preferably a marking as referenced 320 is further provided to identify the respective section of passage outlet of each insert 300.

The nozzle 314 chosen as a function of the desired flow rate is connected to the exterior of the container of the reserve via the aforementioned conduit 280. If needs be it is possible to provide plugs for sealing off the other nozzles 314. However, as those skilled in the art will understand, the nozzles 314 not connected to the exterior of the container via the conduit 280 may remain in free communication with the inner volume of the reserve without disrupting the operation of the device.

Obviously as will be understood on examining the appended figures, the connecting tube 280 itself emerges onto the exterior of the trays 100a at the level of an outlet orifice 282.

The float casing 200 is made of a material of density lower than water preferably. It may for example be a plastic material such as polyethylene or polypropylene, potentially filled.

Those skilled in the art will understand that the realisation of the casing 200 in two complementary shells 250, 260 assembled by screws 204 enables an easy dismantling for purposes of cleaning and maintenance, particularly to clean the inlet gratings 272, to remove materials capable of being accumulated in the settling chamber 274 and to clean or to replace the fine filters 276.

As a non-limiting example, the sections of the calibrated passage orifices 316 provided in the nozzles 314 are chosen in a range extending from a diameter of 1 mm to 3 mm.

The operation of the device which has just been described is essentially as follows.

When the level N of water in the reserve formed in the bottom of the trays 100 is above the height of the inlet orifice 230 formed by the upper edge of the partitions 259, the float 210 floats above the bottom of a tray. The water enters into the chamber 220 via the gratings 272, frees itself potentially of impurities in the settling chambers 274 and empties out into the chamber 220 above the partition 259, the passages between the upper edge of the partition 259 and the covering shell 260 forming the inlet orifices 230. After filtration through the fine filter 276, the water exits via the outlet orifice 240 connected to the connecting conduit 280.

When on the other hand the level N of water in the reserve of the tray drops below the height of an inlet orifice 230, the floating regulator rests on the bottom 100a of a tray. The transfer of water between the inlet orifice 230 and the outlet orifice 240 is interrupted and the function of the floating regulator is also interrupted.

Obviously the present invention is not limited to the embodiments that have just been described, but extends to any variant in accordance with its spirit.

According to an embodiment variant means enabling the adjustment of the height of water reserve are for example provided, by adjustment of the height of the inlet orifice level 230.

Numerous embodiment variants may be envisaged for this purpose.

It is possible for example to provide to intercalate a wedge or washer around the pillar 290 under the float 210. The function of floating regulator controlling the flow is interrupted when the float 210 rests on the aforementioned wedge of chosen height. The height of the wedge or washer makes it possible to modify the height of water reserve conserved under the inlet orifice 230.

Fine adjustment means may also be provided, for example based on threaded means.

To this end a threaded height adjustable foot may be provided under the base of the float 210 or instead a nut forming wedge or screwed stop, thus height adjustable, on the pillar 290 or instead an adjustable pillar 290 including a height adjustable stop, for example in the form of a pillar composed of two elements. It is also possible to provide means making it possible to adjust the height of the inlet orifice 230 on the casings 202.

To this end it is possible for example to provide a plurality of inlet orifices 230 spread out in height on the circumference of the float casing 202 and means making it possible to seal off selectively all the inlet orifices except that 230 which it is wished to keep functional.

A relative adjustment of two casing elements may also be provided, for example connected by complementary screwing means, the upper casing element having the inlet orifice 230 and the lower casing element having the outlet orifice 240.

According to another variant, the bottom of the tray has a staged relief and means are provided making it possible to fix the guiding means 290 selectively in different places on the bottom of the tray, corresponding to different height levels. The place thus chosen for the float conditions the reserve volume since this reserve volume is a function of the place where the float comes to rest on account of the staged relief formed on the bottom.

Figure 9:
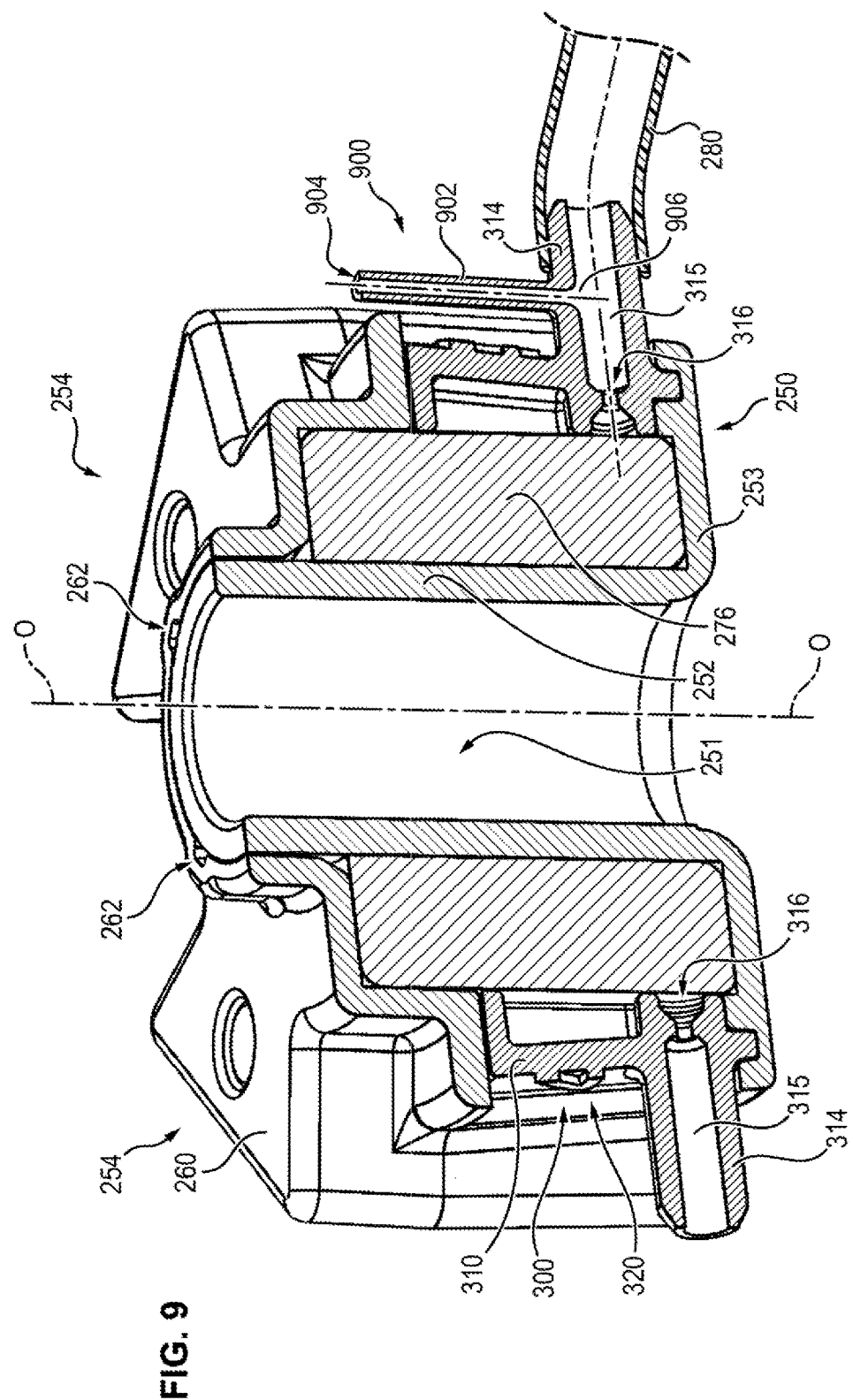
FIG. 9 represents a perspective view with vertical section of the floating regulator casing along a first plane of diametric section according to another example of embodiment of the present invention.
Figure 10:
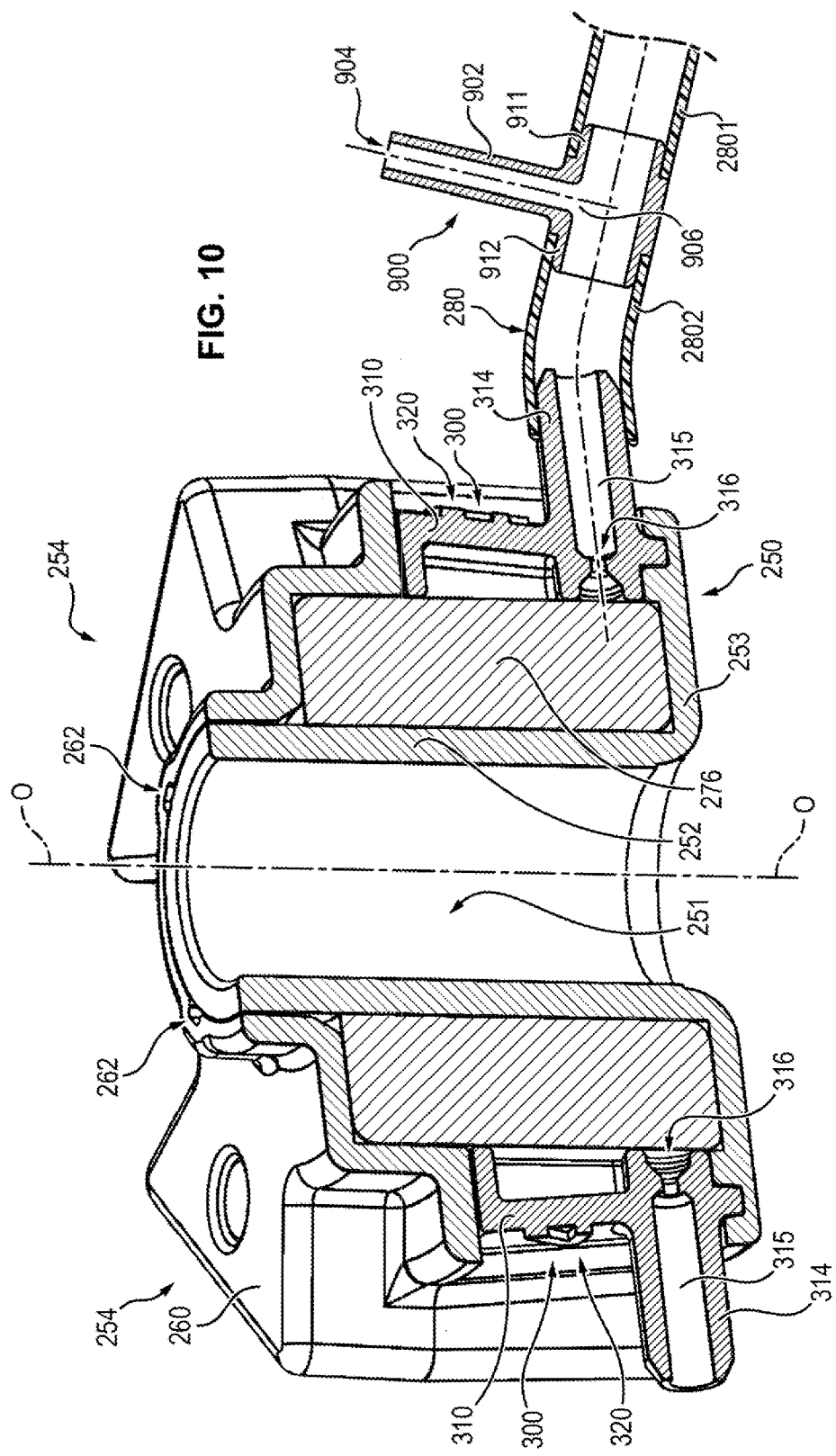
FIG. 10 represents a perspective view with vertical section of the floating regulator casing along a first plane of diametric section according to yet another example of embodiment of the present invention.

With reference to FIGS. 9 and 10, the system or the floating regulator may further include means 900 forming air intake, for example an air intake, adapted to introduce air between the lower calibrated outlet orifice of reduced section 240 and the exterior of the container.

When the water level rises in the water reserve, a higher and higher column of water can form between the lower calibrated outlet orifice of reduced section 240 and the connection with the exterior of the container, which can worsen the constancy of the flow and thus the flow rate through acceleration. In particular when a flexible connecting tube 280 connects the outlet orifice 240 provided on the floating regulator 200 to the exterior of the container, its inclination may be at the origin of such a column of water. The means 900 forming air intake may make it possible to introduce air between the lower calibrated outlet orifice of reduced section 240 and the exterior of the container, for example in the flexible connecting tube 280, for example as a function of atmospheric pressure if the air comes from a zone subjected to this pressure, reducing by as much the flow rate of fluid. It is thus possible to further improve the constancy of the flow rate of fluid while creating a balance between the potential acceleration of the flow and the amount of air introduced.

The means 900 forming air intake may include an air supply conduit or a pipe 902 having an outer orifice 904 adapted to emerge into a zone occupied by air, for example air at atmospheric pressure, and an inner orifice 906 emerging between the lower calibrated outlet orifice of reduced section 240 and the exterior of the container, so as to create a fluidic connection between the two orifices or such that air circulates from the outer orifice 904 to the inner orifice 906. In particular, the system is dimensioned such that the outer orifice 904 emerges above the float line of the floating regulator. In particular, the air supply conduit or pipe 902 may have a sufficient rigidity and length to assure that the outer orifice 904 emerges above the float line of the floating regulator. The system is for example adapted so that the air supply conduit or pipe 902 is substantially vertical when the floating regulator floats in the water.

With reference to FIG. 9, the means 900 forming air intake may be adapted to introduce air at the level of the nozzle 314, for example downstream of the calibrated orifice 316 in the direction of flow of the water, for example at the level of the central through passage 315, the inner orifice 906 being able for example to emerge at this place. This system has the advantage of being easy to dimension because the means 900 forming air intake may form an integral part of the floating regulator which makes it possible to assure that the air intake is always functional and supplies the amount of air necessary for a constant flow rate. The air supply conduit or pipe 902 may extend from a central part of the nozzle 314 so as to form with the nozzle 314 a T-shaped structure. The air supply conduit or pipe 902 may be positioned so as to extend in a substantially vertical manner in the direction of the surface of the water when the floating regulator floats in the water, the length of the air supply conduit or pipe 902 being for example comprised between 20% and 80%, for example between 25% and 60%, for example between 30% and 40% of the height of the floating regulator, so that the outer orifice 904 is outside of the water when the floating regulator floats in the water.

With reference to FIG. 10, the means 900 forming air intake may be adapted to introduce air downstream of the nozzle 314 in the sense of flow of the water, for example at the level of the flexible connecting tube 280. The means 900 forming air intake may thus form an integral part of the flexible connecting tube 280 or be formed of a separate piece being able to be connected to two sections 2801 and 2802 of the flexible connecting tube. It is thus possible, for a same floating regulator, to adapt the system as a function of the water reserve by changing both the flexible connecting tube 280 and the means 900 forming air intake.

In particular, the separate piece forming the means 900 forming air intake may include at least one first nozzle 911 adapted to be placed in fluidic connection with the inner orifice 906, the first nozzle 911 having for example such an external diameter compared to the inner diameter of a first section 2801 of the conduit 280 that the separate piece may be in communication with the exterior of the container, for example by inserting one end of the first section 2801 of the conduit onto the first nozzle 911.

In particular, the separate piece forming the means 900 forming air intake may include at least one second nozzle 912 adapted to be placed in fluidic connection with the inner orifice 906, the second nozzle 912 having for example such an external diameter compared to the inner diameter of a second section 2802 of the conduit 280 that the separate piece may be connected to the nozzle 314 of the floating regulator, for example by inserting one end of the second section 2802 of the conduit 280 onto the second nozzle 912.

The air supply conduit or pipe 902 may extend from a part forming junction between the first nozzle 911 and the second nozzle 912 so as to form with the first 911 and second 912 nozzles a T-shaped structure. The air supply conduit or pipe 902 and the second section of the conduit 280 may be dimensioned so that, whatever the water level, when the floating regulator floats in water, the incline and the length of the air supply conduit or pipe 902 are such that the outer orifice 904 is outside of the water.

The air supply conduit or pipe 902 may typically have a diameter greater than half of the diameter of the nozzle 314 and/or the diameter of the flexible connecting tube 280, typically greater than or equal to the diameter of the nozzle 314 and/or to the diameter of the flexible connecting tube 900, typically greater than the diameter of the nozzle 314 and/or to the diameter of the flexible connecting tube 280, typically less than or equal to double the diameter of the nozzle 314 and/or to double the diameter of the flexible connecting tube 280, typically comprised between 110% and 160% of the diameter of the flexible connecting tube 280, typically comprised between 120% and 150% of the diameter of the flexible connecting tube 280, typically of the order of 140% of the diameter of the flexible connecting tube 280. It is thus possible to optimise the effect of the means 900 forming air intake on the constancy of the flow rate of water.

The invention is not limited to the particular application described previously equipping plant growing trays. The invention may also apply to the control of flow rate of water for any terrace or equivalent element capable of containing a water reserve, for example in the form of flooring made of wood or made of stone resting on blocks or any other structure. The invention may also apply to the control of flow rate of water for any other reserve without cultivation.

Generally speaking, beyond the direct irrigation of plants, the invention and the means of maintaining a water reserve that it proposes may apply to numerous applications among which may be cited in a non-limiting manner:
- the maintaining of a water reserve enabling a storage for input of fertilizers and top ups, distributed progressively to plants,
- the equipping of settling basins, avoiding thanks to the constitution of a permanent reserve a risk of mechanism of sedimentation and from there limiting the necessity of cleaning out,
- the equipping of intermediate basins in a waste water settling unit, and
- the equipping of intermediate basins in geothermal installations, making it possible to purify the water between the geothermal withdrawal and the points of use, for example in radiators.

The present invention particularly enables compared to the prior art a good management of the reserve while enabling a control of constant flow rate while limiting as much as possible the necessity of adding an additional irrigation.

It is thus possible to differentiate two types of reserves: a "dynamic" or "temporary" reserve managed by the regulator device 200 and which corresponds to the volume evacuated via the conduit 280, and a permanent reserve, potentially adjustable, situated under the level of the inlet orifices 230, which is not affected by the controlled emptying by the regulator 200.

Preferably the equipped trays are provided with marking means making it possible to define those of the trays equipped with the floating regulator to facilitate maintenance.

According to another embodiment variant the floating regulator according to the invention is placed in a sealed cartridge but in fluidic communication with the reserve volume of the trays 100, arranged outside of the trays 100 to facilitate maintenance operations.

As indicated previously the invention relates as much to systems forming a water reserve equipped with the flow control device based on floating regulator 200, as to the floating regulator 200 itself.

The invention also relates to the use of these systems and floating regulators for the discharge at constant flow rate of a surplus of water reserve and a method of controlling a water reserve implementing these means.

Those skilled in the art will understand that, in certain cases, the present invention makes it possible to be free of the necessity of having available overflow orifices on the top of the partitions 124.

The invention claimed is:

1. System for vegetation cultivation comprising:
   a water reserve, and
   a floating regulator placed in the reserve to monitor a level of water therein, which floating regulator defines a chamber having at least one upper inlet orifice in fluidic communication with the reserve, at least one lower calibrated outlet orifice in communication with an exterior of a container of the reserve,
   wherein the floating regulator allows a discharge of water towards the exterior of the container via the at least one lower calibrated outlet orifice at a constant flow rate when a level of water in the reserve is above the at least one upper inlet orifice and the floating regulator is freely floating,
   wherein the floating regulator interrupts a discharge of water towards the exterior of the container via the at least one lower calibrated outlet orifice when a level of water is below the at least one upper inlet orifice,
   wherein the chamber is an annular chamber,
   wherein the at least one upper inlet orifice includes several inlet orifices,
   wherein the at least one lower calibrated outlet orifice includes several outlet orifices,
   wherein several upper inlet orifices and several lower outlet orifices are spread out around a vertical axis, and
   wherein the different outlet orifices have different calibrated diameters.

2. System according to claim 1 wherein the system includes a flexible connecting tube which connects one of the at least one lower calibrated outlet orifice provided on the floating regulator with the exterior of the container, the one of the at least one lower calibrated outlet orifice defining the main orifice of head loss towards the exterior.

3. System according to claim 1 wherein the system includes means of guiding with vertical movement the floating regulator.

4. System according to claim 3 wherein the guiding means including a vertical pillar engaged in a through channel formed at the centre of the floating regulator.

5. System according to claim 1 wherein the system includes filtering means inserted between each inlet orifice and each outlet orifice.

6. System according to claim 1 wherein the system includes a filtering stage.

7. System according to claim 1 wherein the at least one lower calibrated outlet orifice is defined on at least one insert, respectively, added onto a casing.

8. System according to claim 1 wherein the system includes means of adjusting a height of the at least one upper inlet orifice.

9. System according to claim 8 wherein the means of adjusting the height of the at least one upper inlet orifice includes wedges or washers of variable thicknesses placed around a guiding pillar under the floating regulator, or a height adjustable foot connected to the floating regulator, or a nut screwed onto a guiding pillar and forming a stop to the floating regulator, or a guiding pillar including a pillar bearing a height adjustable stop, or a plurality of inlet orifices provided at different heights on a casing and capable of being sealed off selectively, or a casing made of two parts capable of relative movement and respectively comprising an inlet orifice and an outlet orifice, or a tray of which the bottom has a staged relief which conditions the reserve volume as a function of the place where the float comes to rest.

10. System according to claim 1 wherein the floating regulator includes a casing that includes at least one vent.

11. System according to claim 1 wherein the floating regulator is made of thermoplastic material.

12. System according to claim 1 wherein the floating regulator includes a casing formed of two dismantleable elements to facilitate maintenance.

13. System according to claim 1 wherein the container of the water reserve constitutes a tray, particularly for the revegetation of roofs of buildings or terraces.

14. System according to claim 1, wherein the system further includes means forming air intake adapted to introduce air between the at least one lower calibrated outlet orifice and the exterior of the container.

15. System according to claim 1 wherein the system includes a first filtering stage including a coarse filter, a second filtering stage including a settling chamber, and a third filtering stage including a fine filter.

16. System according to claim 1 wherein the floating regulator is made of polyethylene and/or polypropylene.

17. System according to claim 1 wherein the floating regulator is made of a material having a density lower than the density of water.

18. System according to claim 1 wherein at least one of the at least one lower calibrated outlet orifice is below than the at least one upper inlet orifice.

19. System according to claim 1 wherein when the floating regulator does not rest on a bottom of the reserve, a flow rate of water discharging from the floating regulator via the at least one lower calibrated outlet orifice is defined by a height of a water column present above the at least one lower calibrated outlet orifice, the height of the water column present above the at least one lower calibrated outlet orifice being constant and consequently the discharge flow rate being constant.

20. System according to claim 1, wherein the annular chamber is defined between a central cask and an external radially cylindrical partition.

21. System according to claim 1, wherein the system includes a labyrinth forming settling chamber.

22. System according to claim 1, wherein the system includes a coarse filter, a settling chamber and a fine filter.

23. System according to claim 22, wherein the settling chamber is a labyrinth forming settling chamber.

24. System according to claim 1, wherein it includes a casing in two complementary shells so as to enable dismantling for purpose of removing materials capable of being accumulated in the settling chamber.

25. System according to claim 1, wherein it includes a plurality of vents to connect the volume of the chamber with the exterior, the vents enabling a free escape of an air capable of being contained originally in the chamber.

26. System according to claim 25, wherein the vents are in the form of vertical through passages.

27. System according to claim 26, wherein the vents are defined between an upper covering shell and a top of a cask.

28. System according to claim 1, wherein the system includes excrescences spread out around an axis, an inlet orifice being provided at the level of each excrescence.

29. System according to claim 28, wherein an outlet orifice is provided between each pair of adjacent excrescences.

30. System according to claim 29, wherein the annular chamber is defined between a central cask and an external radially cylindrical partition, the excrescences being radial excrescences spread out around the axis, on the outer surface of the partition, the excrescences being each delimited by two radial vertical flanks and a vertical exterior radially peripheral wall.

31. System according to claim 1, wherein it includes an air intake adapted to introduce air between the lower calibrated outlet orifice and an exterior of the container, the air intake including an air supply conduit or pipe having an outer orifice adapted to emerge into a zone occupied by air, and an inner orifice emerging between the lower calibrated outlet orifice and the exterior of the container, so as to create a fluidic connection between the two orifices or such that air circulates from the outer orifice to the inner orifice.

32. Floating regulator for use in a system for vegetation cultivation having a reserve, the floating regulator comprising:
  at least one upper inlet orifice and at least one lower calibrated outlet orifice,
  wherein the floating regulator allows a discharge of water via the at least one lower calibrated outlet orifice at a constant flow rate when a level of water in which the floating regulator is disposed is above the at least one upper inlet orifice and the floating regulator is freely floating,
  wherein the floating regulator defines a chamber having the at least one upper inlet orifice in fluidic communication with the reserve, the at least one lower calibrated outlet orifice in communication with an exterior of a container of the reserve,
  wherein the chamber is an annular chamber,
  wherein the at least one upper inlet orifice includes several inlet orifices, wherein the at least one lower calibrated outlet orifice includes several outlet orifices, wherein several upper inlet orifices and several lower outlet orifices are spread out around a vertical axis, and wherein the different outlet orifices have different calibrated diameters.

33. Floating regulator according to claim 32 wherein the floating regulator is made of a material having a density lower than the density of water.

* * * * *